(12) United States Patent
Hioki et al.

(10) Patent No.: US 12,172,233 B2
(45) Date of Patent: *Dec. 24, 2024

(54) LASER-BEAM WELDING METHOD AND LASER-BEAM WELDING APPARATUS

(71) Applicant: TOYOTA JIDOSHA KABUSHIKI KAISHA, Toyota (JP)

(72) Inventors: Toru Hioki, Miyoshi (JP); Shuhei Ogura, Nagakute (JP); Hiroki Toriyama, Toyota (JP); Ryosuke Kawai, Okazaki (JP); Shun Kato, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1091 days.

This patent is subject to a terminal disclaimer.

(21) Appl. No.: 17/084,698

(22) Filed: Oct. 30, 2020

(65) Prior Publication Data
US 2021/0046585 A1     Feb. 18, 2021

Related U.S. Application Data

(63) Continuation of application No. 16/002,437, filed on Jun. 7, 2018, now Pat. No. 10,857,624.

(30) Foreign Application Priority Data

Jun. 15, 2017  (JP) ................. 2017-117997

(51) Int. Cl.
*B23K 26/242* (2014.01)
*B23K 26/082* (2014.01)
(Continued)

(52) U.S. Cl.
CPC .......... *B23K 26/242* (2015.10); *B23K 26/082* (2015.10); *B23K 26/244* (2015.10); *B23K 2103/10* (2018.08)

(58) Field of Classification Search
CPC .. C12Q 1/6804; C12Q 1/6806; C12Q 1/6809; C12Q 1/6844; C12Q 1/6883;
(Continued)

(56) References Cited

U.S. PATENT DOCUMENTS 5,591,360 A * 1/1997 Mombo-Caristan ... B23K 26/32
                                                                219/121.64
5,595,670 A    1/1997 Mombo-Caristan
(Continued)

FOREIGN PATENT DOCUMENTS

JP    S54-116356 A    9/1979
JP    H01-157778 A    6/1989
(Continued)

*Primary Examiner* — Nathaniel E Wiehe
*Assistant Examiner* — Ket D Dang
(74) *Attorney, Agent, or Firm* — Oliff PLC

(57) ABSTRACT

While a laser-beam application position is moved along a locus which circularly or elliptically circles around a locus center so as to cross a weld line that is a boundary between a first metal plate and a second metal plate overlapped with each other, the locus center is moved in a direction parallel to a weld line. A moving direction of the laser-beam application position is set such that the laser beam is first applied to the first metal plate and then to the second metal plate when the laser beam passes through an unmelted zone of the first metal plate and the second metal plate. The unmelted zone is located downstream of a range through which the laser beam has already passed in the direction parallel to the weld line.

8 Claims, 7 Drawing Sheets

(51) Int. Cl.
*B23K 26/244* (2014.01)
*B23K 103/10* (2006.01)

(58) Field of Classification Search
CPC ...... C12Q 2600/154; H03J 3/08; H03J 7/065; H03J 7/08; H04B 1/1027; H04B 15/04; H04B 2001/1054; H04B 2215/064; H04H 40/90; B23K 2103/10; B23K 26/082; B23K 26/242; B23K 26/244
USPC .................................................. 219/121.64
See application file for complete search history.

(56) References Cited

U.S. PATENT DOCUMENTS

| | | | |
|---|---|---|---|
| 5,603,853 | A * | 2/1997 | Mombo-Caristan ........................ B23K 26/1437 219/121.64 |
| 10,857,624 | B2 * | 12/2020 | Hioki ................... B23K 26/242 |
| 2015/0352666 | A1 | 12/2015 | Fujita et al. |
| 2016/0207142 | A1 | 7/2016 | Kawamoto et al. |
| 2016/0354867 | A1 | 12/2016 | Matsuoka et al. |
| 2016/0361775 | A1 * | 12/2016 | Collis .................. B23K 9/0953 |
| 2018/0126491 | A1 | 5/2018 | Nakagawa et al. |
| 2019/0126398 | A1 * | 5/2019 | Yang ..................... B23K 26/22 |

FOREIGN PATENT DOCUMENTS

| | | |
|---|---|---|
| JP | H08-192286 A | 7/1996 |
| JP | H10-071480 A | 3/1998 |
| JP | H11-019787 A | 1/1999 |
| JP | 2001-071286 A | 3/2001 |
| JP | 2003-170285 A | 6/2003 |
| JP | 2015-199110 A | 11/2015 |
| JP | 3209369 U | 3/2017 |
| WO | 96/26807 A1 | 9/1996 |
| WO | 2015/072107 A1 | 5/2015 |
| WO | 2015/129248 A1 | 9/2015 |
| WO | 2015/132651 A2 | 9/2015 |
| WO | 2016/194322 A1 | 12/2016 |

* cited by examiner

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

LASER-BEAM WELDING METHOD AND LASER-BEAM WELDING APPARATUS

PRIORITY AND INCORPORATION BY REFERENCE

This is a continuation of U.S. patent application Ser. No. 16/002,437, filed Jun. 7, 2018, which claims priority to Japanese Patent Application No. 2017-117997 filed on Jun. 15, 2017. The entire disclosure of each of the above applications, including the specification, drawings and abstract, is incorporated herein by reference in its entirety.

BACKGROUND

1. Technical Field

The disclosure relates to a laser-beam welding method of performing lap fillet welding using a laser beam, and relates also to a laser-beam welding apparatus configured to implement the laser-beam welding method.

2. Description of Related Art

Lap fillet welding has been employed as a technique for joining a plurality of metal plates together. Japanese Unexamined Patent Application Publication No. 2003-170285 (JP 2003-170285 A) describes a technique pertaining to lap fillet welding for joining two aluminum-based metal plates together. In this technique, composite welding including laser-beam welding and metal-inert-gas (MIG) arc welding is performed. More specifically, an upper plate and a lower plate, each of which is an aluminum-based metal plate, are overlapped with each other, and then a laser beam is applied from a laser diode to a laser-beam application region including a portion of the upper and a portion of the lower plate. Further, a welding wire is supplied from a distal end of a welding torch onto the laser-beam application region to which the laser beam is being applied, and an electric arc is generated at a position rearward of the laser-beam application region in the direction of welding. In this way, welding is performed. Thus, deep weld-penetration is achieved without causing burn through of a melted zone (i.e., a zone in the laser-beam application region, where a metallic material has been melted). As a result, satisfactory welding quality is achieved.

SUMMARY

However, the technique described in JP 2003-170285 A causes an increase in the size of welding equipment and complication of the welding equipment because the composite welding including the laser-beam welding and the MIG arc welding is performed. In view of this, the technique described in JP 2003-170285 A has room for improvement in practicability.

The disclosure provides a laser-beam welding method of performing lap fillet welding for joining a plurality of metal plates together and a laser-beam welding apparatus configured to implement the laser-beam welding method, the laser-beam welding method and the laser-beam welding apparatus making it possible to achieve satisfactory welding quality without causing an increase in the size of welding equipment or complication of the welding equipment.

A first aspect of the disclosure relates to a laser-beam welding method of performing lap fillet welding by applying a laser beam to a laser-beam application region that includes a portion of a first metal plate and a portion of a second metal plate. The first metal plate and the second metal plate are included in a plurality of metal plates overlapped with each other. The first metal plate is located on a first side in a plate-thickness direction of the plurality of metal plates, and the second metal plate is located on a second side in the plate-thickness direction of the plurality of metal plates. The laser beam is applied from the first side to the laser-beam application region. The laser-beam welding method includes moving a laser-beam application position such that, while the laser-beam application position is moved along a locus which circularly or elliptically circles around a locus center so as to cross a weld line that is a boundary between the first metal plate and the second metal plate, the locus center is moved in a direction parallel to the weld line. A moving direction of the laser-beam application position which conforms to the locus is set such that the laser beam is first applied to the first metal plate and then to the second metal plate when the laser beam passes through an unmelted zone of the first metal plate and the second metal plate. The unmelted zone is located downstream of a range through which the laser beam has already passed in the direction parallel to the weld line.

With this configuration, during the lap fillet welding that is performed by applying a laser beam to the laser-beam application region from the first side in the plate-thickness direction of the plurality of metal plates, while the laser-beam application position is moved along the locus which circularly or elliptically circles around the locus center so as to cross the weld line that is the boundary between the first metal plate and the second metal plate, the locus center is moved in the direction parallel to the weld line. The moving direction of the laser-beam application position which conforms to the locus is set such that the laser beam is first applied to the first metal plate located on the first side and then to the second metal plate located on the second side when the laser beam passes through the unmelted zone of the first metal plate and the second metal plate, which is located downstream of the range through which the laser beam has already passed in the direction parallel to the weld line.

Hence, while the laser beam is applied to the first metal plate, the metallic material of the first metal plate is melted at the laser-beam application position and thus the first metal plate and the second metal plate are bridged. In this case, heat of the laser beam is transmitted to the second metal plate in addition to the first metal plate, so that the first metal plate and the second metal plate are welded to each other appropriately at this laser-beam application position. Because the heat of the laser beam is transmitted to both the first metal plate and the second metal plate, a region in the vicinity of the laser-beam application position on the first metal plate at this time is in a state where the amount of heat input in the region is relatively small and the metallic material is not sufficiently melted. Then, the laser-beam application position moved along the locus reaches the first metal plate again after passing through the second metal plate. Thus, in the above-described region on the first metal plate where the metallic material has not been sufficiently melted (i.e., the region in the vicinity of the position where the first metal plate and the second metal plate have been already welded to each other), the metallic material is completely melted due to application of the laser beam. As a result, the first metal plate and the second metal plate are welded to each other appropriately also at this laser-beam application position.

As described above, when the laser-beam application position moved along the locus which circularly or elliptically circles around the locus center reaches the first metal plate again, the metallic material in the region, which has not been melted sufficiently, is melted at the laser-beam application position on the first metal plate. That is, the laser beam is not applied toward a region where the metallic material has been completely melted. Thus, a situation where the laser beam is applied toward the region in which the metallic material has been completely melted and thus the molten material (i.e., the molten metal) is blown off due to the pressure of a keyhole is less likely to occur. Thus, it is possible to obtain a sufficient thickness (throat of a bead) of a weld spot (i.e., a region where the metallic material has been solidified after being melted), thereby achieving a sufficient joint strength (i.e., weld strength) at the weld spot. According to the first aspect of the disclosure, it is possible to achieve satisfactory welding quality just by setting the locus (movement locus) of the laser-beam application position as described above. Consequently, it is no longer necessary to employ another welding method (i.e., MIG arc welding) that would be performed in combination with the laser-beam welding. As a result, it is possible to obtain a high-quality lap fillet weld spot (welded joint) without causing an increase in the size of welding equipment or complication of the welding equipment.

In the first aspect, the first metal plate and the second metal plate may be overlapped with each other such that a distal end surface of the second metal plate is shifted with respect to a distal end surface of the first metal plate to provide a stepwise configuration.

In the first aspect, the first metal plate may be an upper plate, the second metal plate may be a lower plate, the upper plate and the lower plate may be overlapped with each other in a vertical direction, the laser beam may be applied, from above, to the laser-beam application region, and the moving direction of the laser-beam application position which conforms to the locus may be set such that the laser beam is first applied to the upper plate and then to the lower plate when the laser beam passes through the unmelted zone of the upper plate and the lower plate. The unmelted zone is located downstream of the range through which the laser beam has already passed in the direction parallel to the weld line.

Hence, while the laser beam is applied to the upper plate, the metallic material of the upper plate is melted at the laser-beam application position and thus the upper plate and the lower plate are bridged. Thus, heat of the laser beam is transmitted to the lower plate in addition to the upper plate. In addition, molten metal of the upper plate at this portion easily flows into a melted zone of the lower plate due to the action of gravity, so that the molten metal of the upper plate and molten metal of the lower plate are mixed with each other. That is, when the upper plate and the lower plate are overlapped with each other in the vertical direction, the gravity is used effectively, so that the upper plate and the lower plate are bridged more appropriately and a sufficient thickness of a weld spot (i.e., a region where the metallic material has been solidified after being melted) is obtained. As a result, the upper plate and the lower plate are welded to each other with a higher joint strength.

In the first aspect, the first metal plate may be a lower plate, the second metal plate may be an upper plate, the upper plate and the lower plate may be overlapped with each other in a vertical direction, the laser beam may be applied, from below, to the laser-beam application region, and the moving direction of the laser-beam application position which conforms to the locus may be set such that the laser beam is first applied to the lower plate and then to the upper plate when the laser beam passes through the unmelted zone of the upper plate and the lower plate. The unmelted zone is located downstream of the range through which the laser beam has already passed in the direction parallel to the weld line.

In the first aspect, each of the metal plates may be an aluminum-based metal plate.

The aluminum-based metal plate has a melting point that is lower than that of a steel sheet. Therefore, when lap fillet welding is performed while the laser-beam application position is moved along the locus which circularly or elliptically circles around the locus center, if the moving direction of the laser-beam application position which conforms to the locus is not set, the laser beam may be applied to a region where the metallic material has been completely melted. In this case, the molten metal may be blown off due to the pressure of a keyhole, and a sufficient throat cannot be obtained. In the first aspect, the laser beam is first applied to the first metal plate and then to the second metal plate. Thus, when the laser-beam application position moved along the locus which circularly or elliptically circles around the locus center reaches the upper plate again, the metallic material in the region (i.e., the region in the first plate, which is in the vicinity of the position where the upper plate and the lower plate have been already welded to each other) where the metallic material has not been melted sufficiently is melted. Therefore, a situation where the laser beam is applied to the region where the metallic material has been completely melted is less likely to occur. It is therefore possible to restrain the molten metal from being blown off due to the pressure of a keyhole. Thus, it is possible to obtain a sufficient thickness (throat of a bead) of a weld spot, thereby achieving a sufficient joint strength at the weld spot. That is, the laser-beam welding method according to the first aspect is a welding method that is effective in lap fillet welding of joining aluminum-based metal plates to each other.

A second aspect of the disclosure relates to a laser-beam welding apparatus configured to perform lap fillet welding by the laser-beam welding method according to the first aspect. The laser-beam welding apparatus includes: a scanning unit configured to move the laser-beam application position; and a laser beam scanning control unit configured to control the scanning unit such that, while the laser-beam application position is moved along the locus which circularly or elliptically circles around the locus center so as to cross the weld line that is the boundary between the first metal plate and the second metal plate, the locus center is moved in the direction parallel to the weld line. The first metal plate is located on the first side in the plate-thickness direction of the plurality of metal plates, and the second metal plate is located on the second side in the plate-thickness direction of the plurality of metal plates. The laser beam scanning control unit is configured to control the scanning unit to move the laser-beam application position such that the laser beam is first applied to the first metal plate and then to the second metal plate when the laser beam passes through the unmelted zone of the first metal plate and the second metal plate. The unmelted zone is located downstream of the range through which the laser beam has already passed in the direction parallel to the weld line.

With the laser-beam welding performed by the laser-beam welding apparatus, it is possible to achieve satisfactory welding quality just by setting the locus (movement locus) of the laser-beam application position as described above. Consequently, it is no longer necessary to employ another welding method (i.e., MIG arc welding) that would be performed in combination with the laser-beam welding. As a result, it is possible to obtain a high-quality lap fillet weld spot (welded joint) without causing an increase in the size of welding equipment or complication of the welding equipment.

The disclosure relates to lap fillet welding performed by applying a laser beam to the laser-beam application region that includes a portion of the first metal plate and a portion of the second metal plate. The first metal plate and the second metal plate are included in a plurality of metal plates overlapped with each other. The first metal plate is located on the first side in the plate-thickness direction of the plurality of metal plates, and the second metal plate is located on the second side in the plate-thickness direction of the plurality of metal plates. The laser beam is applied from the first side to the laser-beam application region. The moving direction of the laser-beam application position which conforms to the locus that circularly or elliptically circles around the locus center is set such that the laser beam is first applied to the first metal plate and then to the second metal plate when the laser beam passes through the unmelted zone of the first metal plate and the second metal plate. The unmelted zone is located downstream of the range through which the laser beam has already passed in the direction parallel to the weld line. Thus, when the laser-beam application position reaches the first metal plate again after passing through the second metal plate, the metallic material in the region (i.e., the region in the metal plate located on the first side) where the metallic material has not been melted sufficiently is melted. That is, the laser beam is not applied toward a region where the metallic material has been completely melted. Thus, a situation where the laser beam is applied toward the region in which the metallic material has been completely melted and thus the molten metal is blown off due to the pressure of a keyhole is less likely to occur. Thus, it is possible to obtain a sufficient thickness (throat of a bead) of a weld spot, thereby achieving a sufficient joint strength at the weld spot. Consequently, it is no longer necessary to employ another welding method (i.e., MIG arc welding) that would be performed in combination with the laser-beam welding. As a result, it is possible to obtain a high-quality lap fillet weld spot without causing an increase in the size of welding equipment or complication of the welding equipment.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, example embodiments of the disclosure will be described with reference to the accompanying drawings. The following embodiment of the disclosure relates to a laser-beam welding method implemented by a laser-beam welding apparatus used in a process of manufacturing a vehicle body for an automobile.

Schematic Configuration of Laser-Beam Welding Apparatus

Figure 1:
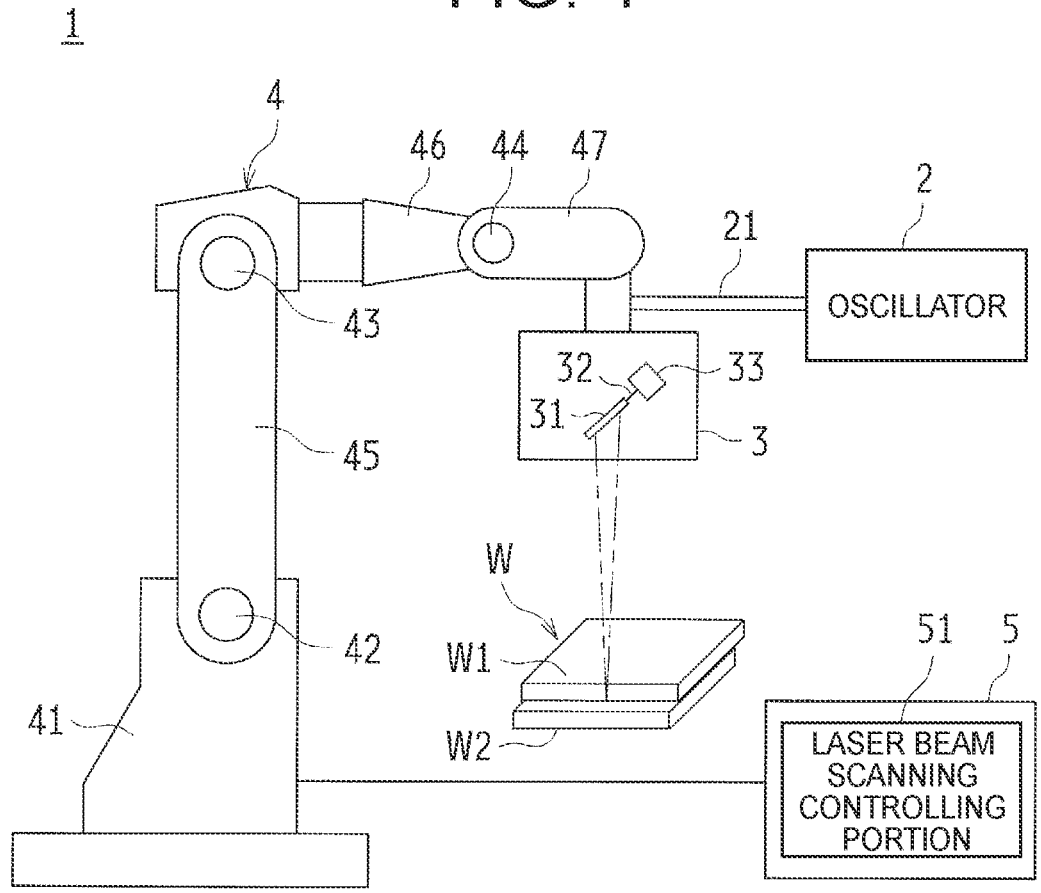
FIG. 1 is a diagram schematically illustrating the configuration of a laser-beam welding apparatus according to an embodiment.

FIG. 1 is a diagram schematically illustrating the configuration of a laser-beam welding apparatus 1 used in laser-beam welding according to the present embodiment. As illustrated in FIG. 1, the laser-beam welding apparatus 1 includes a laser oscillator 2, a laser scanner 3, a welding robot 4, and a robot controller 5.

The laser oscillator 2 is configured to generate a laser beam. The laser beam generated by the laser oscillator 2 is guided to the laser scanner 3 through an optical fiber cable 21. Examples of a laser beam include a carbon dioxide laser beam, a YAG (yttrium aluminum garnet) laser beam, and a fiber laser beam.

The laser scanner 3 is configured to apply the laser beam, which has been guided thereto through the optical fiber cable 21, to a workpiece W including two aluminum-alloy plates (i.e., aluminum-based metal plates) W1, W2 that are overlapped with each other (see long dashed short dashed lines in FIG. 1). A lens group (not illustrated) and a plurality of mirrors 31 (only one mirror 31 is illustrated in FIG. 1) are accommodated in the laser scanner 3. The lens group includes, for example, a collimating lens configured to adjust the laser beam into a collimated beam and a condensing lens configured to condense the laser beam such that the laser beam comes into a focus at a machining point of the workpiece W (i.e., at a predetermined laser-beam application position on the workpiece W). Each mirror 31 is configured to be turnable (pivotable) about a turnable shaft 32. More specifically, the turnable shaft 32 is connected to a scanning motor 33, and each mirror 31 is turned (pivots) in response to a turning motion of the turnable shaft 32 caused by an operation of the scanning motor 33. The mirrors 31 are turned such that a laser-beam application position (i.e., a position to which a laser beam is applied) can be moved within a predetermined range of the workpiece W. Thus, the laser-beam application position can be moved without moving the laser scanner 3 itself. For example, a galvanometer mirror may be used as each mirror 31.

The welding robot 4 is configured to move the laser scanner 3. An articulated robot is used as the welding robot 4. More specifically, in the present embodiment, the welding robot 4 includes a base 41, a rotary mechanism (not illustrated) accommodated inside the base 41, joints 42, 43, 44, and arms 45, 46, 47. In response to rotation of the rotary mechanism and oscillating motions of the arms 45, 46, 47 about the joints 42, 43, 44, the laser scanner 3 can be moved in a given direction.

Information (i.e., information, such as a turning angle of each of the joint 42, 43, 44) for moving the laser scanner 3 toward a to-be-welded spot (i.e., a spot to be welded) is stored in the robot controller 5 in advance through off-line teaching. After a vehicle body is conveyed to a welding-process site on a vehicle body manufacturing line, the welding robot 4 operates based on the information, in response to a control signal from the robot controller 5. Thus, the laser scanner 3 faces the to-be-welded spot, and a laser beam is applied from the laser scanner 3 toward the to-be-welded spot. In this way, the laser-beam welding is performed sequentially.

The robot controller 5 includes a laser beam scanning control unit 51 configured to output a control signal for moving the laser-beam application position on the workpiece W. The laser beam scanning control unit 51 is configured to output a control signal to the scanning motor 33. When the scanning motor 33 operates in response to the control signal, each mirror 31 is turned about the turnable shaft 32 to move the laser-beam application position on the workpiece W. How the laser-beam application position is moved on the workpiece W will be described later.

Welding Method

Next, a welding method according to the present embodiment will be described. In the present embodiment, lap fillet welding is performed on two aluminum-based metal plates W1, W2 that are overlapped with each other in the vertical direction, and a laser beam emitted from the laser scanner 3 is applied, from above, to a laser-beam application region (described later in detail) including a portion of the aluminum-based metal plate W1 and a portion of the aluminum-based metal plate W2. In the following description, the aluminum-based metal plate located on the upper side will be referred to as an upper plate W1, and the aluminum-based metal plate located on the lower side will be referred to as a lower plate W2. That is, the upper plate W1 is an example of "first metal plate located on a first side (i.e., one side in the plate-thickness direction of the metal plates)" in the disclosure, and the lower plate W2 is an example of "second metal plate located on a second side (i.e., the other side in the plate-thickness direction of the metal plates)" in the disclosure.

Figure 2:
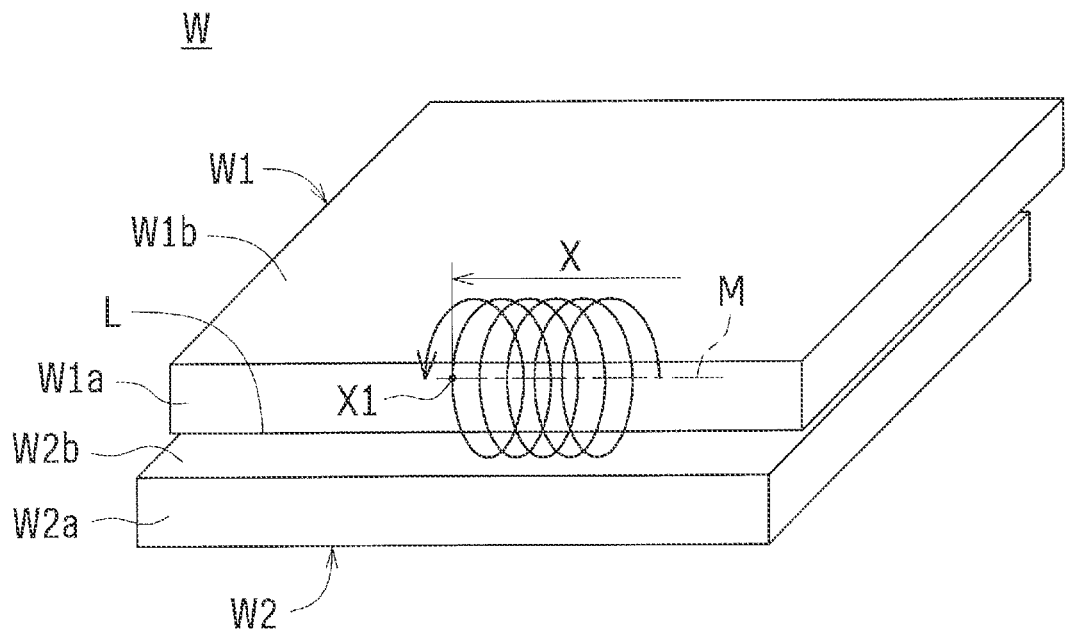
FIG. 2 is a perspective view of a workpiece, FIG. 2 illustrating how a laser-beam application position is moved in the embodiment.
Figure 3:
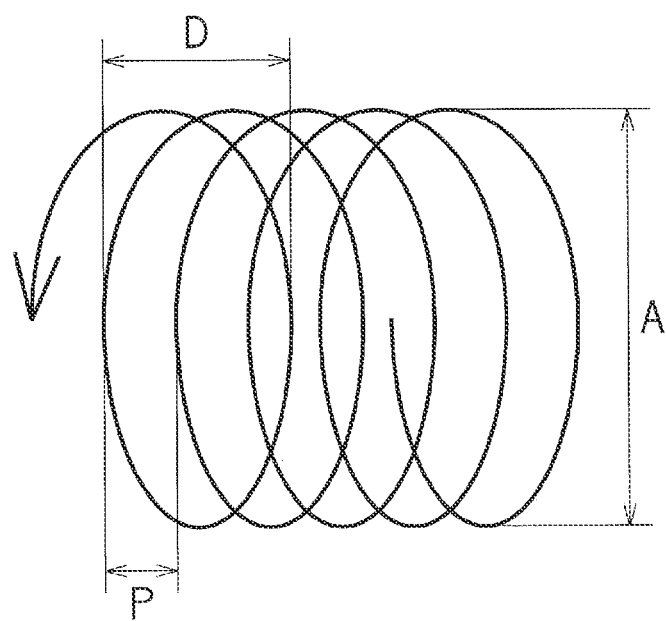
FIG. 3 is a view illustrating a locus of the laser-beam application position.

FIG. 2 is a perspective view of the workpiece W. FIG. 2 illustrates how a laser-beam application position is moved in the present embodiment. FIG. 3 is a view illustrating a locus (movement locus) of the laser-beam application position.

As illustrated in FIG. 2 and FIG. 3, in the lap fillet welding in the present embodiment, a metallic material is melted in a region along a weld line L that is a boundary between the upper plate W1 and the lower plate W2 that are overlapped with each other, to weld the upper plate W1 and the lower plate W2 to each other. More specifically, a distal end surface W2a (a first front end surface in FIG. 2) of the lower plate W2 is slightly shifted (offset) toward a front side with respect to a distal end surface W1a (a second front end surface in FIG. 2) of the upper plate W1. As a result, a stepwise configuration is provided by the upper plate W1 and the lower plate W2. Then, a laser beam is applied such that the focusing point of the laser beam is elliptically moved within a predetermined range including i) a front end portion of a top surface W1b of the upper plate W1, ii) the distal end surface W1a of the upper plate W1, and iii) a portion of a top surface W2b of the lower plate W2. The predetermined range is an example of the laser-beam application region. Thus, the metallic material is melted, so that the upper plate W1 and the lower plate W2 are welded to each other. The welding technique of this kind is generally called laser wobbling welding.

The laser-beam application position is moved on the upper plate W1 and the lower plate W2 in the following manner. As indicated by an arrowed continuous line (i.e., a locus of the laser-beam application position) in FIG. 2, while the laser-beam application position is moved along a locus which elliptically circles around a locus center (hereinafter, the locus will be referred to as "elliptically-shaped locus" where appropriate) so as to cross the weld line L that is the boundary between the upper plate W1 and the lower plate W2 that are overlapped with each other, the locus center is moved in a direction parallel to the weld line L. The locus center signifies the center of the elliptically-shaped locus. A line obtained by connecting the locus centers of the elliptically-shaped locus is indicated by a long dashed short dashed line M in FIG. 2, and the long dashed short dashed line M is parallel to the weld line L.

The feature of the present embodiment is the moving direction of the laser-beam application position (i.e., the direction in which the laser-beam application position is moved) that conforms to the elliptically-shaped locus. More specifically, the moving direction of the laser-beam application position is set such that a laser beam is first applied to the upper plate W1 (an example of the first metal plate located on the first side) and then to the lower plate W2 (an example of the second metal plate located on the second side) when the laser beam passes through an unmelted zone of the upper plate W1 and the lower plate W2 (i.e., a zone to which the laser beam has not been applied and in which the metallic material has not been melted, that is, a region located leftward of a point X1 in FIG. 2), which is located downstream (leftward, in FIG. 2) of a range (a range X in FIG. 2) through which the laser beam has already passed in the direction parallel to the weld line L. That is, while the laser-beam application position is moved along the locus which elliptically circles around the locus center in FIG. 2 in the counterclockwise direction, the locus center is moved in the leftward direction that is parallel to the weld line L. As described above, a control signal is output from the laser beam scanning control unit 51 to the scanning motor 33 configured to turn the mirrors 31 and then the scanning motor 33 is operated to turn the mirrors 31, so that the laser-beam application position is moved. Therefore, the scanning motor 33 and the mirrors 31 are an example of a scanning unit (a scanning unit configured to move the laser-beam application position) in the disclosure.

The elliptically-shaped locus of the laser-beam application position will be described below in more detail. For example, when the upper plate W1 and the lower plate W2 each have a plate-thickness of 1.5 mm to 3.0 mm, a length (amplitude) A of the elliptical shape of the locus in its major axis direction (i.e., an up-down direction in FIG. 3, which is perpendicular to the weld line L) is set to a predetermined value within a range from 2.5 mm to 3.5 mm, as illustrated in FIG. 3. Further, a width D of the elliptical shape of the locus in its minor axis direction (i.e., a right-left direction in FIG. 3, which is parallel to the weld line L) is set to a predetermined value within a range from 1.0 mm to 2.4 mm. A pitch P in a direction parallel to the weld line L (i.e., a moving amount by which the locus center of the elliptically-shaped locus is moved in the direction parallel to the weld line L, per one turn of the laser-beam application position) is set to a predetermined value within a range from 0.8 mm to 1.6 mm. The length A, the width D, and the pitch P are not limited to the values described above, and may be set as appropriate by experiment or simulation depending on, for example, the plate-thickness of the upper plate W1 and the lower plate W2.

The condition for a laser beam in the present embodiment will be described below. A laser power is set to a predetermined value within a range from 4000 W to 6000 W. A moving speed of the laser-beam application position along the elliptically-shaped locus is set to a predetermined value within a range from 2500 cm/min to 5000 cm/min. The laser power and the moving speed are not limited to the values described above, and may be set as appropriate by experiment or simulation depending on, for example, the plate-thickness of the upper plate W1 and the lower plate W2.

Next, a melting state of the metallic material achieved by the laser-beam welding will be described. FIG. 4A to FIG. 4D are enlarged views each illustrating a weld spot of the workpiece W. FIG. 4A to FIG. 4D illustrate how the laser-beam application position is moved during the laser-beam welding. Points S1 to S4 in FIG. 4A to FIG. 4D indicate the laser-beam application positions. That is, while the laser-beam welding proceeds from the state in FIG. 4A to the state in FIG. 4D, the laser-beam application position is moved along the elliptically-shaped locus indicated by a long dashed short dashed line, sequentially in the order of S1, S2, S3, and S4.

As illustrated in FIG. 4A to FIG. 4D, in the present embodiment, during the lap fillet welding that is performed by applying a laser beam to the laser-beam application region including portions of the upper plate W1 and the lower plate W2 that are overlapped with each other, while the laser-beam application position is moved along the locus which elliptically circles around the locus center so as to cross the weld line L that is the boundary between the upper plate W1 and the lower plate W2, the locus center is moved in the direction (i.e., the leftward direction in FIG. 4A to FIG. 4D) parallel to the weld line L, as described above. Further, while the laser-beam application position is moved in the counterclockwise direction along the locus which elliptically circles around the locus center, the locus center is moved in the leftward direction that is parallel to the weld line L, as illustrated in FIG. 4A to FIG. 4D. That is, the moving direction of the laser-beam application position which conforms to the elliptically-shaped locus is set such that the laser beam is first applied to the upper plate W1 and then to the lower plate W2 when the laser beam passes through the unmelted zone of the upper plate W1 and the lower plate W2, which is located downstream of the range X (see FIG. 2) through which the laser beam has already passed in the direction parallel to the weld line L.

Figure 4A:
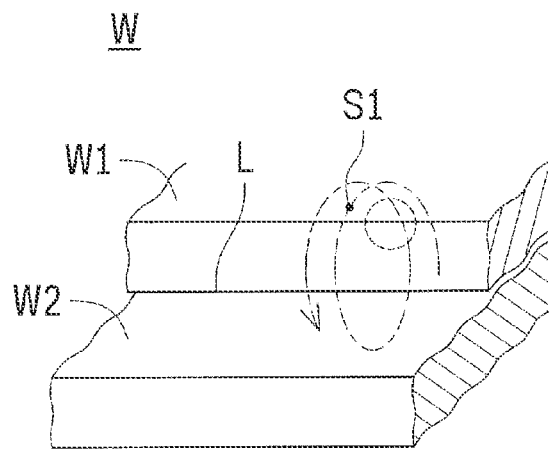
FIG. 4A to FIG. 4D are enlarged views each illustrating a weld spot of the workpiece, FIG. 4A to FIG. 4D illustrating how the laser-beam application position is moved during laser-beam welding according to the embodiment.
Figure 4B:
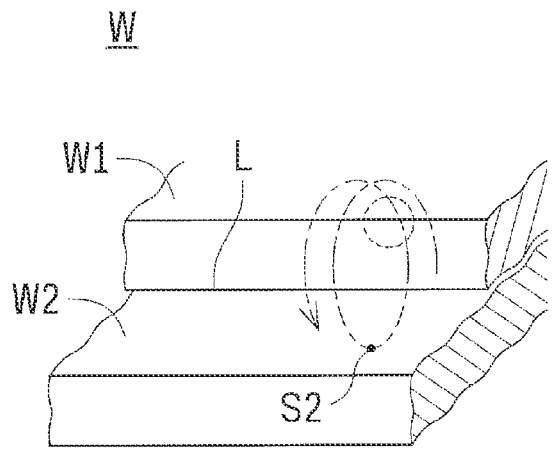
Figure 4C:
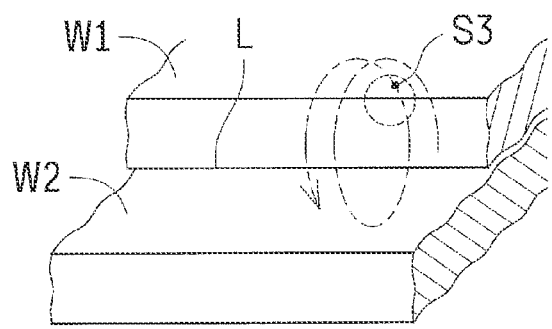
Figure 4D:
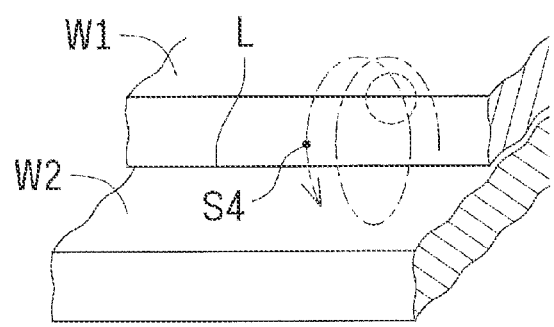

Hence, in the laser-beam application state (the laser-beam application position S1) illustrated in FIG. 4A, the laser beam is applied to the upper plate W1, so that the metallic material of the upper plate W1 is melted at the laser-beam application position S1 and thus the upper plate W1 and the lower plate W2 are bridged. In this case, heat of the laser beam is transmitted to the lower plate W2 in addition to the upper plate W1, so that the upper plate W1 and the lower plate W2 are welded to each other appropriately at this laser-beam application position. Because the heat of the laser beam is transmitted to both the upper plate W1 and the lower plate W2, a region (e.g., a region surrounded by a dashed line in FIG. 4A) in the vicinity of the laser-beam application position S1 on the upper plate W1 at this time is in a state where the amount of heat input therein is relatively small and the metallic material is not sufficiently melted (e.g., a semi-melting state). Then, as illustrated in the laser-beam application state (the laser-beam application position S2) in FIG. 4B, the laser-beam application position moved along the locus reaches the laser-beam application position S2 on the lower plate W2. After that, as illustrated in the laser-beam application state (the laser-beam application position S3) in FIG. 4C, the laser-beam application position reaches the upper plate W1 again and coincides with the laser-beam application position S3. Thus, in the above-described region on the upper plate W1 where the metallic material has not been sufficiently melted (i.e., the region in the vicinity of the position where the upper plate W1 and the lower plate W2 have been already welded to each other; the region surrounded by a dashed line in FIG. 4C), the metallic material is completely melted due to application of the laser beam, so that the upper plate W1 and the lower plate W2 are welded to each other appropriately also at this laser-beam application position. That is, in the laser-beam application state (the laser-beam application position S4) illustrated in FIG. 4D, the molten metallic material solidifies in the region surrounded by a dashed line in FIG. 4D, so that the upper plate W1 and the lower plate W2 are welded to each other appropriately in this region. These operations are performed successively every time the laser-beam application position is turned once along the elliptically-shaped locus. As a result, the metallic material melts in the region along the weld line L, so that welding of the upper plate W1 and the lower plate W2 proceeds.

In the present embodiment, while the laser beam is applied to the upper plate W1, molten metal of the upper plate W1 easily flows into a melted zone of the lower plate W2 due to the action of gravity, so that the molten metal of the upper plate W1 and molten metal of the lower plate W2 are mixed with each other. That is, when the upper plate W1 and the lower plate W2 are overlapped with each other in the vertical direction, the gravity is used effectively, so that the upper plate W1 and the lower plate W2 are bridged more appropriately and a sufficient thickness of the weld spot is obtained. As a result, the upper plate W1 and the lower plate W2 are welded to each other with a higher joint strength.

As described above, in the laser-beam welding method according to the present embodiment, when the laser-beam application position moved along the elliptically-shaped locus reaches the upper plate W1 again, the metallic material in the region, which has not been melted sufficiently, is melted at this application position on the upper plate W1. That is, the laser beam is not applied toward a region where the metallic material has been completely melted. Thus, a situation where the laser beam is applied toward the region in which the metallic material has been completely melted and thus the molten material (i.e., the molten metal) is blown off due to the pressure of a keyhole is less likely to occur. Thus, it is possible to obtain a sufficient thickness (throat of a bead) of a weld spot (i.e., a region where the metallic material has been solidified after being melted), thereby achieving a sufficient joint strength (i.e., weld strength) at the weld spot.

Figure 5:
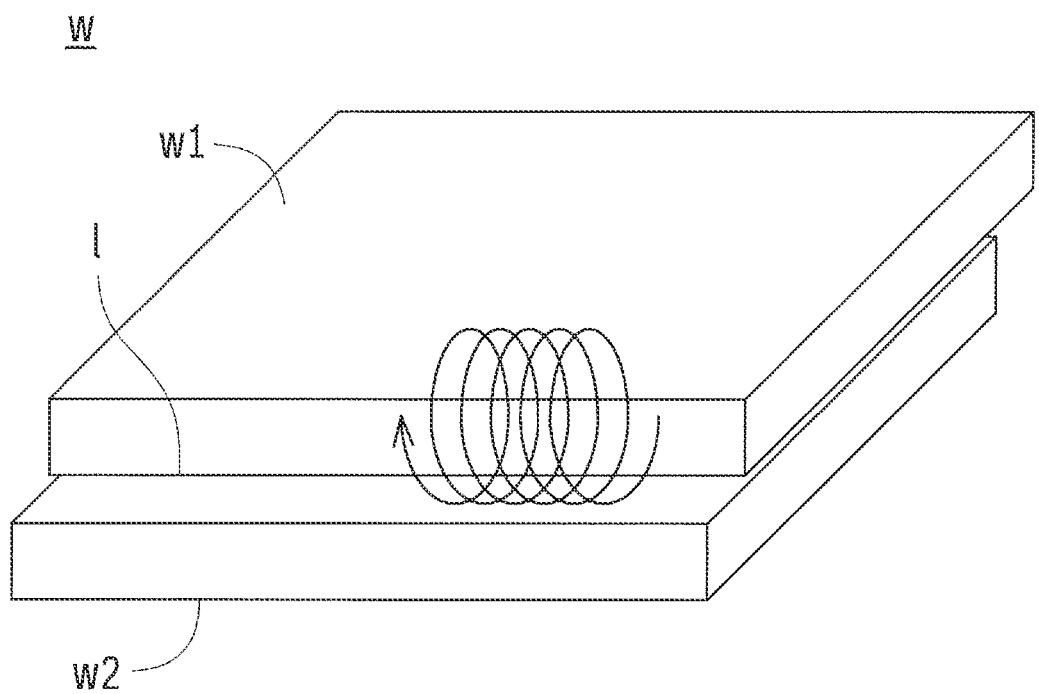
FIG. 5 is a perspective view of a workpiece, FIG. 5 illustrating how a laser-beam application position is moved in a comparative example.
Figure 6A:
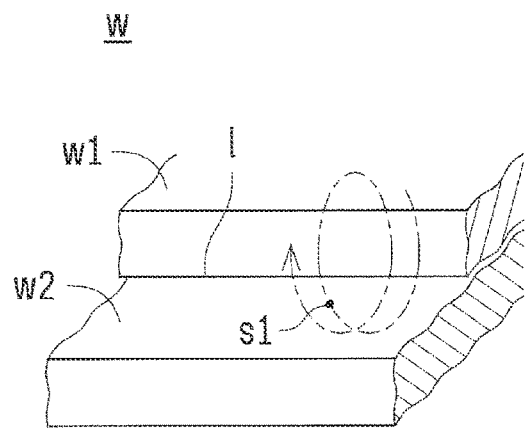
FIG. 6A to FIG. 6C are enlarged views each illustrating a weld spot of the workpiece, FIG. 6A to FIG. 6C illustrating how the laser-beam application position is moved during laser-beam welding according to the comparative example.
Figure 6B:
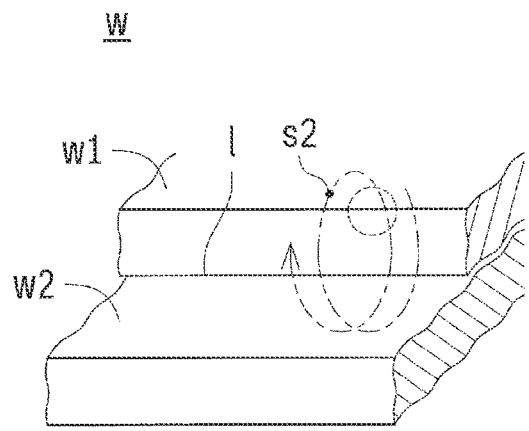
Figure 6C:
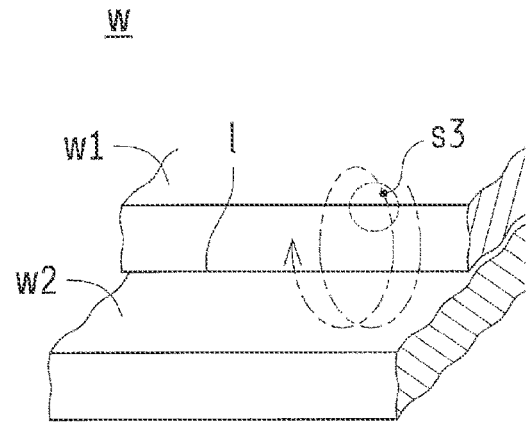

FIG. 5 and FIG. 6A to FIG. 6C illustrate a comparative example in which the moving direction of the laser-beam application position on the locus is a direction (i.e., the clockwise direction) opposite to the moving direction in the present embodiment. FIG. 5 is a perspective view of a workpiece w. FIG. 5 illustrates how a laser-beam application position is moved in the comparative example. FIG. 6A to FIG. 6C are enlarged views each illustrating a weld spot of the workpiece w. FIG. 6A to FIG. 6C illustrate how the laser-beam application position is moved during laser-beam welding according to the comparative example. While the laser-beam welding proceeds from the state in FIG. 6A to the state in FIG. 6C, the laser-beam application position is moved along an elliptically-shaped locus indicated by a long dashed short dashed line, sequentially in the order of s1, s2, and s3.

As illustrated in FIG. 5 and FIG. 6A to FIG. 6C, in the comparative example, during the lap fillet welding that is performed by applying a laser beam to a laser-beam application region including portions of an upper plate w1 and a lower plate w2 that are overlapped with each other, while the laser-beam application position is moved along a locus which elliptically circles around a locus center so as to cross a weld line I that is a boundary between the upper plate w1 and the lower plate w2, the locus center is moved in a direction (i.e., the leftward direction in FIG. 6A to FIG. 6C) parallel to the weld line I. However, the comparative example differs from the foregoing embodiment in that, while the laser-beam application position is moved in the clockwise direction along the locus which elliptically circles around the locus center in FIG. 6A to FIG. 6C, the locus center is moved in the leftward direction that is parallel to the weld line I. Thus, the laser beam is first applied to the lower plate w2 and then to the upper plate w1 when the laser beam passes through an unmelted zone of the upper plate w1 and the lower plate w2. Therefore, even when the laser-beam application state shifts from the laser-beam application state (the laser-beam application position s1) illustrated in FIG. 6A to the laser-beam application state (the laser-beam application position s2) illustrated in FIG. 6B and thus the laser beam is applied to the upper plate w1, the upper plate w1 and the lower plate w2 are not bridged because the upper plate w1 has not been heated sufficiently. This appears conspicuously, especially when a gap is present between the upper plate w1 and the lower plate w2. Therefore, heat of the laser beam remains only in the upper plate w1, and after that, most of the heat of the laser beam is used to melt the upper plate w1. As a result, the metallic material is completely melted at this laser-beam application position and in a region in the vicinity of this laser-beam application position (e.g., a region surrounded by a dashed line in FIG. 6B). After that, as illustrated in the laser-beam application state (the laser-beam application position s3) in FIG. 6C, the laser-beam application position moved along the locus moves on the upper plate w1, so that the laser beam is applied to the metallic material that has been completely melted. As a result, the molten metal is blown off due to the pressure of a keyhole. Consequently, it is difficult to obtain a sufficient thickness (throat of a bead) of a weld spot (i.e., a region where the metallic material has been solidified after being melted). Therefore, it is difficult to achieve a sufficient joint strength (i.e., weld strength) at the weld spot.

In contrast to this, in the present embodiment, when the laser-beam application position reaches the upper plate W1 again, the metallic material in the region where the metallic material has not been melted sufficiently is melted at the laser-beam application position on the upper plate W1, as described above. Thus, a situation where the laser beam is applied toward the region in which the metallic material has been completely melted and thus the molten metal is blown off due to the pressure of a keyhole is less likely to occur. Thus, it is possible to obtain a sufficient thickness of a weld spot, thereby achieving a sufficient joint strength at the weld spot. In the present embodiment, it is possible to achieve satisfactory welding quality just by setting the locus (movement locus) of the laser-beam application position. Consequently, it is no longer necessary to employ another welding method (i.e., MIG arc welding) that would be performed in combination with the laser-beam welding. As a result, it is possible to obtain a high-quality lap fillet weld spot (welded joint) without causing an increase in the size of welding equipment or complication of the welding equipment.

Further, the aluminum-based metal plate has a melting point that is lower than that of a steel sheet. Therefore, when lap fillet welding is performed while the laser-beam application position is moved along the elliptically-shaped locus, if the moving direction of the laser-beam application position which conforms to the elliptically-shaped locus is not set, the laser beam may be applied to a region where the metallic material has been completely melted, as in the comparative example. As a result, a sufficient throat cannot be obtained. In the present embodiment, the moving direction of the laser-beam application position which conforms to the elliptically-shaped locus is set as described above. Thus, when the laser-beam application position moved along the elliptically-shaped locus reaches the upper plate W1 again, the metallic material in the region where the metallic material has not been melted sufficiently is melted. It is therefore possible to restrain the molten metal from being blown off due to the pressure of a keyhole. That is, the laser-beam welding method according to the present embodiment is a welding method that is effective in lap fillet welding of joining aluminum-based metal plates to each other.

Results of Welding

Figure 7A:
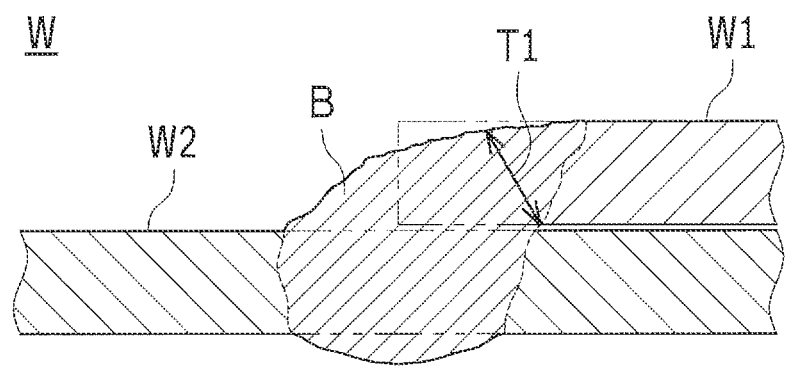
FIG. 7A and FIG. 7B are sectional views of the weld spots of the workpiece, obtained by the laser-beam welding according to the embodiment.
Figure 7B:
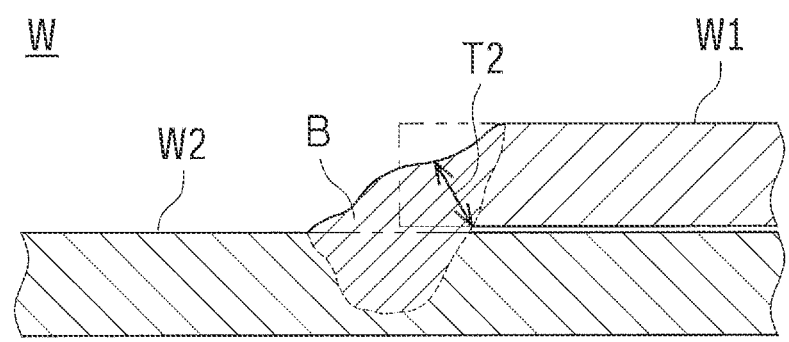

FIG. 7A and FIG. 7B are sectional views of the weld spots of the workpiece W, obtained by the laser-beam welding according to the present embodiment. FIG. 7A is a sectional view of the weld spot of the workpiece W when a melted region (a bead B) of the metallic material, which has been obtained by a laser beam, reaches a bottom surface of the lower plate W2. FIG. 7A illustrates an example in which the power of the laser beam is set to be relatively high. FIG. 7B is a sectional view of the weld spot of the workpiece W when a melted region (a bead B) of the metallic material, which has been obtained by a laser beam, does not reach the bottom surface of the lower plate W2. FIG. 7B illustrates an example in which the power of the laser beam is set to be relatively low.

Figure 8A:
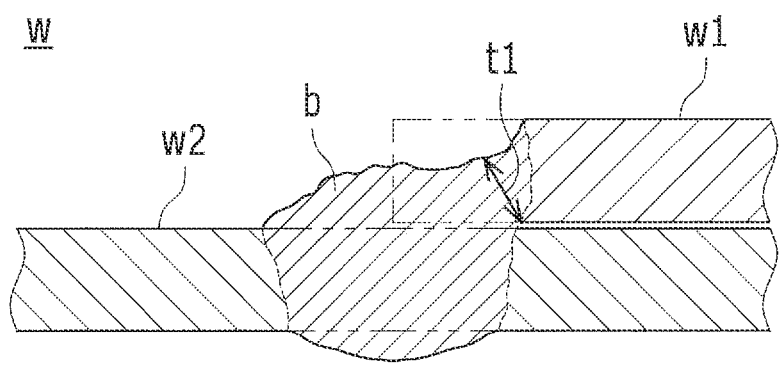
FIG. 8A and FIG. 8B are sectional views of the weld spots of the workpiece, obtained by the laser-beam welding according to the comparative example.
Figure 8B:
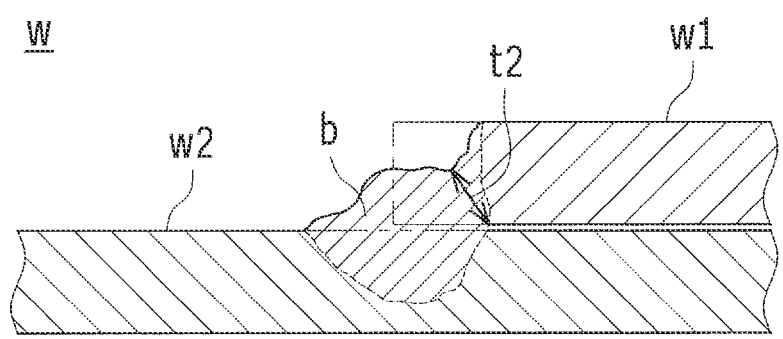

FIG. 8A and FIG. 8B are sectional views of the weld spots of the workpiece w, obtained by the laser-beam welding according to the comparative example. Like FIG. 7A, FIG. 8A is a sectional view of the weld spot of the workpiece w when a melted region (a bead b) of the metallic material, which has been obtained by a laser beam, reaches a bottom surface of the lower plate w2. FIG. 8A illustrates an example in which the power of the laser beam is set to be relatively high. Like FIG. 7B, FIG. 8B is a sectional view of the weld spot of the workpiece w when a melted region (a bead b) of the metallic material, which has been obtained by a laser beam, does not reach the bottom surface of the lower plate w2. FIG. 8B illustrates an example in which the power of the laser beam is set to be relatively low.

Comparison between FIG. 7A and FIG. 8A will be described below. In the workpiece w (FIG. 8A) that has been subjected to the laser-beam welding according to the comparative example, a throat is t1 in FIG. 8A, which indicates that a sufficient throat is not obtained. Therefore, a sufficient joint strength may not be obtained. On the other hand, in the workpiece W (FIG. 7A) that has been subjected to the laser-beam welding according to the present embodiment, a throat is T1 in FIG. 7A, which indicates that a sufficient throat is obtained. Therefore, a sufficient joint strength is also obtained. In the workpiece W in the present embodiment, the throat is increased by around 30% in comparison with that in the workpiece w in the comparative example.

Comparison between FIG. 7B and FIG. 8B will be described below. In the workpiece w (FIG. 8B) that has been subjected to the laser-beam welding according to the comparative example, a throat is t2 in FIG. 8B, which indicates that a sufficient throat is not obtained. Therefore, a sufficient joint strength may not be obtained. On the other hand, in the workpiece W (FIG. 7B) that has been subjected to the laser-beam welding according to the present embodiment, a throat is T2 in FIG. 7B, which indicates that a sufficient throat is obtained. Therefore, a sufficient joint strength is also obtained.

From the verification of the results of welding, it has been found that, with the welding method according to the present embodiment, a high-quality lap fillet weld spot (welded joint) can be obtained.

Other Embodiments

The disclosure is not limited to the foregoing embodiment. To the contrary, the disclosure is intended to cover various modifications and equivalent arrangements within the scope of the appended claims.

For example, in the foregoing embodiment, the disclosure is applied as the laser-beam welding method implemented by the laser-beam welding apparatus 1 used in a process of manufacturing a vehicle body for an automobile. However, the disclosure may be also applied to laser-beam welding to be performed on other members.

In the foregoing embodiment, lap fillet welding for joining together two aluminum-based metal plates, that is, the upper plate W1 and the lower plate W2, is performed while the laser-beam application position is moved along the locus which elliptically circles around the locus center. However, the manner of performing the laser-beam welding according to the disclosure is not limited to this. For example, lap fillet welding may be performed while the laser-beam application position is moved along the locus which circularly (perfectly-circularly) circles around the locus center. Further, the disclosure is applicable to a case where lap fillet welding is performed on three metal plates. That is, the laser-beam application position is moved over the three metal plates along the locus which circularly or elliptically circles around the locus center. Further, the disclosure is applicable to a case where lap fillet welding is performed on steel sheets. Further, the disclosure is applicable to a case where lap fillet welding is performed on metal plates that are overlapped with each other in the horizontal direction or another direction.

In the foregoing embodiment, while the laser-beam application position is moved along the locus that elliptically circles around the locus center, the locus center is moved in the direction along the weld line L. In the foregoing embodiment, the mirrors 31 are turned to move the laser-beam application position along the locus and to move the locus center in the direction along the weld line L. However, the devices used to move the laser-beam application position and the locus center are not limited to the mirrors 31. For example, the mirrors 31 are turned to move the laser-beam application position along the locus that elliptically circles around the locus center, and the arms 45, 46, 47 of the welding robot 4 are oscillated to move the locus center along the direction parallel to the weld line L.

The disclosure is applicable to a laser-beam welding method of performing lap fillet welding for joining aluminum-based metal plates together using a laser beam, and is also applicable to a laser-beam welding apparatus configured to implement the laser-beam welding method.

What is claimed is:

1. A laser-beam welding method of performing lap fillet welding by applying a laser beam to a laser-beam application region, the laser-beam application region including a portion of a first metal plate and a portion of a second metal plate, the first metal plate and the second metal plate being included in a plurality of metal plates overlapped with each other, the first metal plate being located on a first side in a plate-thickness direction of the plurality of metal plates and the second metal plate being located on a second side in the plate-thickness direction of the plurality of metal plates, the first metal plate and the second metal plate being overlapped with each other such that a distal end surface of the second metal plate is shifted with respect to a distal end surface of the first metal plate to provide a stepwise configuration, and the laser beam being applied from the first side to the laser-beam application region, the laser-beam welding method comprising:

moving a laser-beam application position such that, while the laser-beam application position is moved along a locus which circularly or elliptically circles around a locus center so as to cross a weld line that is a boundary between the first metal plate and the second metal plate, the locus center is moved in a direction parallel to the weld line, wherein the laser-beam application position is moved within a predetermined range including i) a first-side surface of the first metal plate, ii) the distal end surface of the first metal plate, and iii) a first-side surface of the second metal plate; and bridging the first metal plate to the second metal plate by laser-beam welding, wherein a surface of the first metal plate that is bridged to the second metal plate is flat, wherein:

a moving direction of the laser-beam application position which conforms to the locus is set such that the laser beam is first applied to the first metal plate and then to the second metal plate when the laser beam passes through an unmelted zone of the first metal plate and the second metal plate, the unmelted zone being located downstream of a range through which the laser beam has already passed in the direction parallel to the weld line.

2. The laser-beam welding method according to claim 1, wherein:

the first metal plate is an upper plate, and the second metal plate is a lower plate, the upper plate and the lower plate are overlapped with each other in a vertical direction, the laser beam is applied, from above, to the laser-beam application region, and the moving direction of the laser-beam application position which conforms to the locus is set such that the laser beam is first applied to the upper plate and then to the lower plate when the laser beam passes through the unmelted zone of the upper plate and the lower plate, the unmelted zone being located downstream of the range through which the laser beam has already passed in the direction parallel to the weld line.

3. The laser-beam welding method according to claim 1, wherein:

the first metal plate is a lower plate, and the second metal plate is an upper plate, the upper plate and the lower plate are overlapped with each other in a vertical direction, the laser beam is applied, from below, to the laser-beam application region, and the moving direction of the laser-beam application position which conforms to the locus is set such that the laser beam is first applied to the lower plate and then to the upper plate when the laser beam passes through the unmelted zone of the upper plate and the lower plate, the unmelted zone being located downstream of the range through which the laser beam has already passed in the direction parallel to the weld line.

4. The laser-beam welding method according to claim 1, wherein each of the metal plates is an aluminum-based metal plate.

5. A laser-beam welding apparatus configured to perform lap fillet welding by the laser-beam welding method according to claim 1, the laser-beam welding apparatus comprising:
   a scanning unit configured to move the laser-beam application position; and
   a laser beam scanning control unit configured to control the scanning unit such that, while the laser-beam application position is moved along the locus which circularly or elliptically circles around the locus center so as to cross the weld line that is the boundary between the first metal plate and the second metal plate, the locus center is moved in the direction parallel to the weld line, the first metal plate being located on the first side in the plate-thickness direction of the plurality of metal plates and the second metal plate being located on the second side in the plate-thickness direction of the plurality of metal plates, and the first metal plate and the second metal plate being overlapped with each other such that a distal end surface of the second metal plate is shifted with respect to a distal end surface of the first metal plate to provide a stepwise configuration, wherein the laser beam scanning control unit is configured to control the scanning unit to move the laser-beam application position within a predetermined range including i) a first-side surface of the first metal plate, ii) the distal end surface of the first metal plate, and iii) a first-side surface of the second metal plate, and to move the laser-beam application position such that the laser beam is first applied to the first metal plate and then to the second metal plate when the laser beam passes through the unmelted zone of the first metal plate and the second metal plate, the unmelted zone being located downstream of the range through which the laser beam has already passed in the direction parallel to the weld line.

6. The laser-beam welding method according to claim 1, wherein the first metal plate and the second metal plate each have a plate-thickness of 1.5 mm to 3.0 mm.

7. The laser-beam welding method according to claim 1, wherein the method further includes applying the laser beam to a region of the first metal plate that is in a semi-melting state.

8. The laser-beam welding method according to claim 1, wherein the first metal plate is an upper plate, the second metal plate is a lower plate, and a line obtained by connecting locus centers of the locus of the laser-beam application position is on a side surface of the upper plate.

* * * * *